UNITED STATES PATENT OFFICE.

ALADAR FONYÓ, OF CHICAGO, ILLINOIS.

GRAPE-JUICE AND PROCESS OF PREPARING SAME.

1,207,014. Specification of Letters Patent. Patented Dec. 5, 1916.

No Drawing. Application filed March 25, 1916. Serial No. 86,590.

*To all whom it may concern:*

Be it known that I, ALADÁR FONYÓ, a citizen of Hungary, residing at Chicago, in the county of Cook and State of Illinois, have invented certain new and useful Improvements in Grape-Juice and Processes of Preparing Same, of which the following is a specification.

This invention relates to grape juice and to a process of preparing same.

The chemical composition of many varieties of grapes are such that the juice expressed therefrom, although having a pleasant flavor when fresh, becomes insipid and nauseous when allowed to stand. The flavor of grape juice is attributed to odoriferous organic compounds and to the tartaric acid and bitartrates of potassium and calcium contained therein. Varieties of grapes containing relatively large proportions of sugar produce a juice which because of its high sugar content is liable to precipitate the tartaric acid and bitartrates of potassium and calcium upon standing. Juice from such grapes, which form the major proportion of those grown in the United States, are unfit for use in preparing grape juice because of the loss of flavor resulting from the precipitation of tartaric acid and bitartrate of potassium and calcium and because of the sediment formed by these compounds which gives the product an undesirable appearance.

It is understood that the most desirable grapes for use in the preparation of grape juice are those which contain a relatively small proportion of sugar and a relatively high acid content. It has, of course, been suggested that grapes of this character should be cultivated by a process of natural selection in order to produce grape juice of high quality. Unfortunately, however, the chemical composition of grapes varies widely, depending upon the soil and climatic conditions of the region in which they are grown and the production of varieties of grapes, best suited for the preparation of grape juice by the usual and well-known methods, involves practically insurmountable difficulties.

A principal object of my invention is the provision of a process of preparing grape juice which is applicable to all varieties of grapes, regardless of their natural chemical composition and which results in a grape juice of highly desirable character.

A further object of my invention is the provision of a process of increasing the acid content of grape juice, whereby the flavor and zest of the juice is preserved and augmented because of the retention of the natural flavoring constituents of the juice and the addition thereto of a desirable acid taste.

A further object of my invention is the provision of a process of preparing grape juice including a conversion of a portion of the sugar content of the juice into a corresponding proportion of lactic acid which effectually prevents the precipitation of the natural flavoring constituents and increases the palatable character of the juice.

A still further object of my invention is to provide a grape juice in which the natural flavor and zest is not only retained but is augmented and which may be preserved indefinitely without deterioration.

Further objects and advantages of my invention will be apparent as it is better understood by reference to the following specification wherein I have described the preferred embodiments of my invention.

The most desirable mode of applying my invention is as follows: The juice expressed from the grapes is conducted to a suitable container provided with heating and cooling means whereby the temperature of the contents of the container may be varied at will. In this container the juice is heated to a temperature of 55° C., and is inoculated with a pure culture of lactic bacteria such for example as the bacilli *Delbrücki*. At this temperature lactic fermentation commences at once and continues but alcoholic fermentation is precluded. The lactic fermentation results in the conversion of a portion of the sugar content of the juice into lactic acid which imparts a very pleasing, mildly sour taste to the grape juice. The lactic acid formed is permanent and the flavor imparted will remain as long as the grape juice is preserved. It will be understood that other lactic bacteria than that mentioned may be employed and the temperature may be varied to produce the best results with the particular bacteria used.

The fermentation is continued for a period of from six to eighteen hours, during which time from 0.3 to 0.8 per cent. of lactic acid will be produced and I have found from actual experience that this percentage of lactic acid is best adapted to accomplish the desired result. The period of treatment may, however, be shortened or lengthened, depending upon the character of the grapes treated and the proportion of lactic acid may be varied between 0.1 and 1.0 per cent. to produce a desirable acid taste in the grape juice. An even greater proportion of lactic acid may, of course, be formed but above 1.0 per cent. the taste will not be agreeable to the average person. When the fermentation has proceeded sufficiently the juice is heated to a temperature of 82° C., which destroys the lactic bacteria and prevents further production of lactic acid.

During the fermentation the albuminoids in the grape juice partly coagulate and are changed through the action of the acids and heat so that when the juice is cooled to a temperature of approximately 4.4° C. they will precipitate. Tartaric acid and the tartrates present in the juice are less soluble at low temperatures and a portion of these compounds which would precipitate if the juice was allowed to stand are precipitated with the albuminoids. The juice is then filtered to remove the precipitated matter and is ready for bottling and pasteurization. The process results in the separation of all matter which would subsequently precipitate from the juice and consequently the bottled and hermetically sealed juice will remain clear indefinitely.

It has been demonstrated that not only is it possible to produce grape juice according to my method from grapes unsuitable for the purpose when treated by the ordinary methods now in use but that the flavor of grape juice produced from grapes adapted to the purpose is improved by treatment according to my method. The principal advantage of my improved method is, however, the possibility of utilizing large quantities of grapes which have heretofore been useless as grape juice stock.

My method may be varied by producing, in a small quantity a grape juice having a high sugar content or in a mash containing malt, dextrose or other edible material containing sugar and nitrogenous substances, a lactic fermentation resulting in a highly concentrated lactic acid which may be added to the main body of grape juice in quantity sufficient to produce the desired proportion of lactic acid therein, the whole being then heated to approximately 82° C. to destroy the bacteria and subsequently cooled to 4.4° C. as in the method previously described. The results and advantages accomplished by the use of this variation of my method are identical with that previously described.

It will be readily appreciated from the foregoing that I have perfected a method of preparing grape juice and a product resulting therefrom which is highly beneficial not only from an economical standpoint but also by reason of the improved quality of the product which forms a tasteful and healthful beverage. It will be further understood that various changes may be made in my process and its mode of application, as well as in the composition of the product thereof, within the scope of the appended claims without departing from the spirit of my invention or sacrificing any of the material advantages thereof.

I claim:

1. A process of preparing grape juice including the step of artificially increasing the acid content of the juice by a proportion of a palatable acid.

2. A process of preparing grape juice including the step of increasing the acid content of the juice by a proportion of lactic acid.

3. A process of preparing grape juice including the step of increasing the acid content of the juice by lactic acid in the proportion of between 0.1 and 1.0 per cent. approximately of the total quantity of juice.

4. A process of preparing grape juice including the step of increasing the acid content of the juice by lactic fermentation thereof, whereby a proportion of lactic acid is formed therein.

5. A process of preparing grape juice including the step of converting a portion of the sugar content into lactic acid by lactic fermentation.

6. A process of preparing grape juice including the step of increasing the acid content of the juice by subjecting it to lactic fermentation until lactic acid has formed therein in the proportion of between 0.1 and 1.0 per cent. approximately of the total quantity of the juice.

7. A process of preparing grape juice including the step of subjecting the juice to lactic fermentation at a temperature which precludes alcoholic fermentation for a period sufficient to convert a portion of the sugar content into a corresponding proportion of lactic acid.

8. A process of preparing grape juice including subjecting the juice to lactic fermentation at a temperature which precludes alcoholic fermentation for a period sufficient to convert a portion of the natural sugar content into a corresponding proportion of lactic acid, and subsequently heating the juice to a temperature sufficient to destroy the lactic bacteria.

9. A process of preparing grape juice including subjecting the juice to lactic fermentation at a temperature which precludes alcoholic fermentation for a period sufficient to convert a portion of the natural sugar content into a corresponding proportion of lactic acid, heating the juice to a temperature sufficient to destroy the lactic bacteria, and subsequently cooling the juice to permit precipitation of insoluble matter.

10. A process of preparing grape juice including the step of subjecting the juice to the action of the bacilli *Delbrücki* at a temperature of substantially 55° C. for a period sufficient to convert a portion of the sugar content into a corresponding proportion of lactic acid.

11. A process of preparing grape juice including subjecting the juice to the action of the bacilli *Delbrücki* at a temperature of substantially 55° C. for a period sufficient to convert a portion of the sugar content into a corresponding proportion of lactic acid, and subsequently heating the juice to a temperature of substantially 82° C. to destroy the bacilli.

12. A process of preparing grape juice including subjecting the juice to the action of the bacilli *Delbrücki* at a temperature of substantially 55° C. for a period sufficient to convert a portion of the sugar content into a corresponding proportion of lactic acid, heating the juice to a temperature of substantially 82° C. to destroy the bacilli, and subsequently cooling the juice to substantially 4.4° C. to permit the precipitation of insoluble matter.

13. A process of preparing grape juice including subjecting the juice to the action of the bacilli *Delbrücki* at a temperature of substantially 55° C. for a period sufficient to convert a portion of the sugar content into a corresponding proportion of lactic acid, heating the juice to a temperature of substantially 82° C. to destroy the bacilli, cooling the juice and maintaining it at a temperature of approximately 4.4° C. to permit precipitation of insoluble matter, and removing said insoluble matter from the juice.

14. As an article of manufacture, grape juice including as a constituent a proportion of lactic acid.

15. As an article of manufacture, grape juice including as a constituent lactic acid in the proportion of between 0.1 and 1.0 per cent. approximately of the total quantity of juice.

16. As an article of manufacture, grape juice in which a portion of the natural sugar content is replaced by a corresponding proportion of lactic acid.

17. As an article of manufacture, grape juice in which a portion of the natural sugar content is replaced by a corresponding proportion of lactic acid, the proportion of lactic acid varying between 0.1 and 1.0 per cent. approximately of the total quantity of grape juice.

18. As an article of manufacture, grape juice including as a constituent an added proportion of a palatable acid.

ALADAR FONYÓ.

Witnesses:
WM. O. BELT,
M. A. KIDDIE.